Patented Nov. 10, 1931

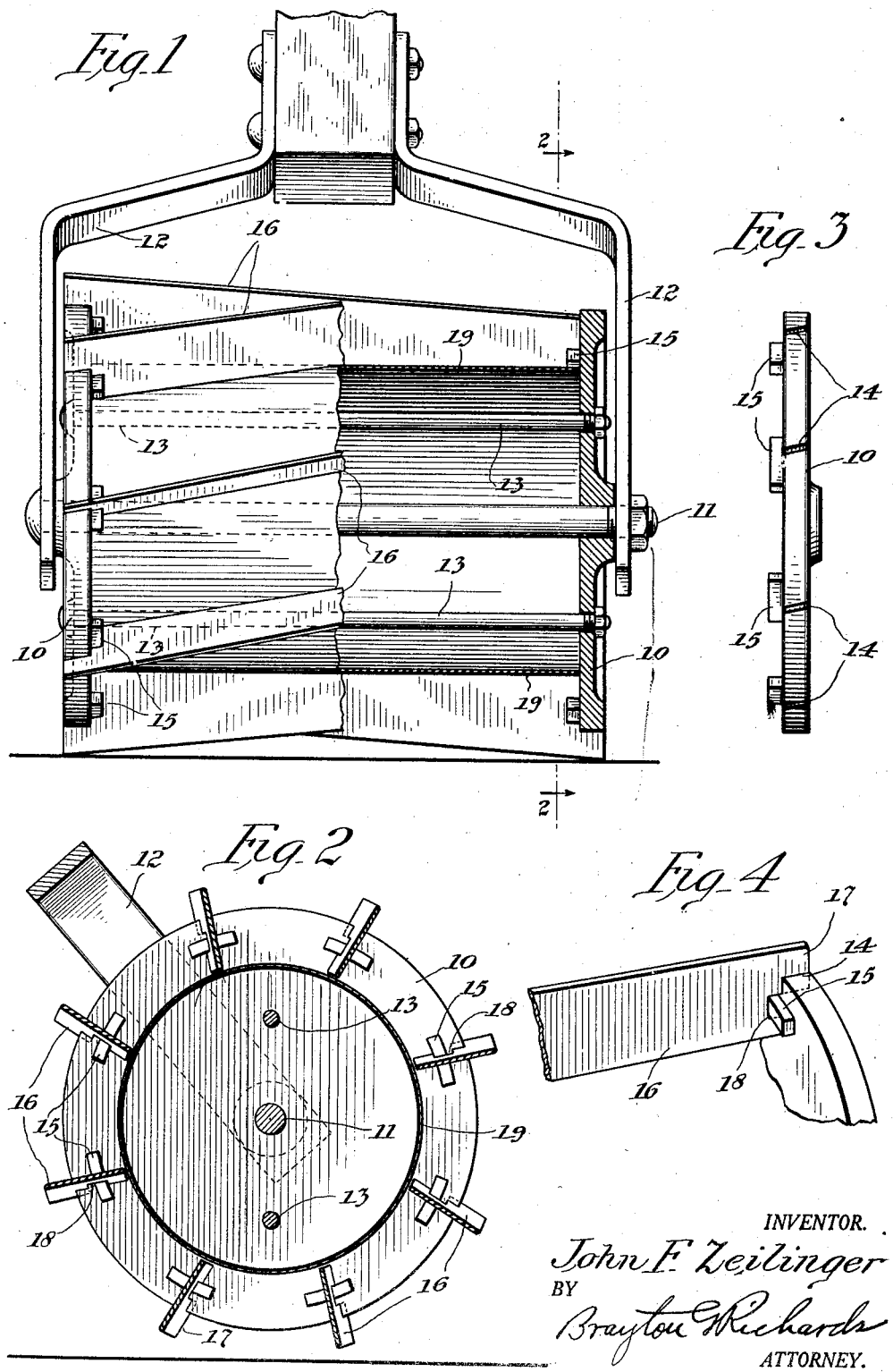

1,831,221

UNITED STATES PATENT OFFICE

JOHN F. ZEILINGER, OF DAVID CITY, NEBRASKA, ASSIGNOR TO THE BARKER MANUFACTURING COMPANY, INC., OF DAVID CITY, NEBRASKA, A CORPORATION OF NEBRASKA

CULTIVATOR

Application filed April 3, 1930. Serial No. 441,250.

The invention relates to improvements in cultivators, especially adapted for use in cultivating gardens, fields and the like, the primary object of the invention being to provide an improved implement of this character which is of simple construction and highly efficient in use.

Another object of the invention is the provision of an implement of this character having special provisions therein for limiting the depth of the cut.

Another object of the invention is the provision of an improved implement of this character so constructed and arranged as to prevent clogging thereof with clods, stones and the like.

Other objects will appear hereinafter.

The invention consists in the combinations and arrangements of parts hereinafter described and claimed.

The invention will be best understood by reference to the accompanying drawings forming a part of this specification, and in which Fig. 1 is a front view, shown partially in section, of a cultivator embodying the invention;

Fig. 2 a vertical section of the same taken substantially on line 2—2 of Fig. 1;

Fig. 3 a detailed view of one of two end disks employed in the construction; and Fig. 4 a partial perspective view showing the arrangement for securing the ends of the cultivator blades to the end disks.

The embodiment of the invention illustrated in the drawings comprises a cylindrical rotary cultivator element consisting of two end disks 10 centrally perforated for the passage of an axle bolt 11 for rotatably mounting the same in a suitable handle member 12. The end disks 10 are detachably secured together by means of longitudinal bolts 13 eccentrically located as shown with reference to the axis of rotation.

Each of the end disks 10 is provided in its periphery with a plurality of transversely inclined slots 14 and with a corresponding securing lug 15 on the inner side thereof adjacent each of the slots 14. Cultivator blades 16 are detachably secured to the peripheries of the end disks 10 in longitudinally inclined relation thereto, as shown. Each of the cultivator blades 16 is provided with an extension 17 at each end adapted to enter the corresponding notch 14 and also with a notch 18 adapted to engage over the corresponding lug 15, as best shown in Fig. 4. A guard drum 19 is positioned as shown between the end plates 10 and is of a diameter to contact with the inner edges of the blades 16, whereby said drum will be securely held in central position in the interior of the cultivator.

In use and in operation, the implement is employed by pushing the same over the ground to be cultivated. The blades 16 will be thereby pressed into the ground, serving to cultivate the same. Obviously, the effect of the drum 19 would be to limit the extent to which the blades 16 may enter the ground and also to exclude clods, stones or other foreign objects from the interior of the cultivator, thereby preventing clogging of the cultivator during use. The specific form and arrangement of parts is a simple and effective one for the purpose.

While I have illustrated and described the preferred form of construction for carrying my invention into effect, this is capable of variation and modification without departing from the spirit of the invention. I therefore do not wish to be limited to the precise details set forth, but desire to avail myself of such variations and modifications as fall within the scope of the appended claims.

Having thus fully described my invention, what I claim as new and desire to secure by Letters Patent is:

1. An improvement of the class described consisting of a rotatable element mounted to be propelled along the ground, said element comprising two circular end disks centrally perforated for the passage of an axle member, each of said end disks being provided in its periphery with transversely inclined slots; lugs on the inner sides of said disks adjacent said slots; blades extending between said disks, the ends of said blades being extended to enter said slots and notched to engage said lugs; two longitudinally extending eccentrically located bolts holding said disks and blades together; and an inner drum resting between said disks and contacting with the inner edges of said blades.

2. An improvement of the class described consisting of a rotatable element mounted to be propelled along the ground, said element comprising two circular end disks centrally perforated for the passage of an axle member; blades extending between said disks, the ends of said blades and the peripheries of said disks being provided with interlocking elements adapted and arranged to disengage upon longitudinal separation of said disks; an inner drum resting between said disks and contacting with the inner edges of said blades; and longitudinally extending eccentrically located bolts holding said disks and blades together.

3. An improvement of the class described comprising a rotatable element mounted to be propelled along the ground, said element comprising two circular end disks; blades extending between said disks, the ends of said blades and the peripheries of said disks being provided with interlocking elements arrange to disengage upon longitudinal separation of said disks from said blades; an inner drum resting between said disks and enclosed by said blades; and detachable means for securing said disks against longitudinal separation from said blades.

In witness whereof, I have hereunto set my hand this 29 day of March, 1930.

JOHN F. ZEILINGER.